United States Patent
Ejiri et al.

(10) Patent No.: US 6,652,999 B2
(45) Date of Patent: Nov. 25, 2003

(54) MAGNETIC RECORDING MEDIUM AND SIGNAL RECORDING SYSTEM COMPRISING AT LEAST TWO MAGNETIC LAYERS WITH ORTHOGONALLY ORIENTED AXES

(75) Inventors: Kiyomi Ejiri, Kanagawa (JP); Minoru Sueki, Kanagawa (JP); Tsutomu Sugisaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/951,392

(22) Filed: Sep. 14, 2001

(65) Prior Publication Data

US 2002/0068197 A1 Jun. 6, 2002

(30) Foreign Application Priority Data

Sep. 14, 2000 (JP) ..................................... P.2000-280053

(51) Int. Cl.$^7$ ............................. G11B 5/68; G11B 5/716
(52) U.S. Cl. ............................... 428/694 BM; 428/336
(58) Field of Search ......................... 428/694 BM, 336

(56) References Cited

U.S. PATENT DOCUMENTS

| | | | | |
|---|---|---|---|---|
| 4,672,495 A | * | 6/1987 | Matsumoto | |
| 4,767,483 A | * | 8/1988 | Itami et al. | 156/154 |
| 4,928,382 A | * | 5/1990 | Fujiwara et al. | |
| 5,382,301 A | * | 1/1995 | Ohkubo et al. | |
| 5,418,059 A | * | 5/1995 | Sugita et al. | 428/332 |
| 5,447,782 A | | 9/1995 | Inaba et al. | |
| 5,470,645 A | * | 11/1995 | Oguchi et al. | |
| 5,518,804 A | | 5/1996 | Mizuno et al. | |
| 5,597,638 A | * | 1/1997 | Saito et al. | |
| 5,978,182 A | * | 11/1999 | Kanai et al. | 360/324.1 |

\* cited by examiner

Primary Examiner—H. Thi Le
(74) Attorney, Agent, or Firm—Sughrue Mion, PLLC

(57) ABSTRACT

A magnetic recording medium comprising two or more magnetic layers provided on a support, wherein an easily magnetizable axis of an uppermost magnetic layer and an easily magnetizable axis of a lower magnetic layer are oriented in directions crossing each other at right angles, which can attain both a highly precise servo write and a higher recording density.

10 Claims, No Drawings

MAGNETIC RECORDING MEDIUM AND SIGNAL RECORDING SYSTEM COMPRISING AT LEAST TWO MAGNETIC LAYERS WITH ORTHOGONALLY ORIENTED AXES

FIELD OF THE INVENTION

The present invention relates to a magnetic recording medium suitable for performing data recording (or information recording) and servo write, and a signal recording system using such a magnetic recording medium.

BACKGROUND OF THE INVENTION

In a magnetic recording system for data storage, a signal for positioning (hereinafter referred also to as "servo signal") is recorded in a medium to enhance the track density. To this end, there have been proposed a method which comprises making a hole in a magnetic layer so that the difference in light reflectance can be detected, a method which comprises forming a track for servo signal only on the magnetic layer surface, and a method which comprises making a hole in a back layer so that the difference in light reflectance can be detected. However, the two former methods are disadvantageous in that the formation of servo track reduces the area for data recording, resulting in the drop of capacity, or the distance between data track and servo track is increased to reduce the positioning precision. The latter method is disadvantageous in servo precision.

In order to solve these problems, it has been proposed in JP-A-6-139555, which corresponds to U.S. Pat. No. 5,518,804, that different signals are recorded in a magnetic medium containing two or more magnetic layers arranged such that Hc of an upper layer is lower than that of a lower layer (Hc: coercive force, hereinafter referred simply to as "Hc" sometimes). However, within the disclosed range of Hc, Hc of the upper layer is low. Thus, such a system is not suitable for high density recording.

In order to raise S/N ratio of data signal (or information signal) to be recorded by sufficiently raising Hc of the upper layer, Hc of the lower layer must be further enhanced, making it difficult to write servo signal.

SUMMARY OF THE INVENTION

An object of the invention is to provide a magnetic recording medium which has no difficulties described above and enables a high precision servo write and recording at a higher density, and a new recording system using such a magnetic recording medium.

The inventors made extensive studies of magnetic recording medium which allows highly precise servo write and recording at a higher density and as a result have completed the present invention.

The foregoing object of the invention is accomplished by the following means of the invention.

(1) A magnetic recording medium comprising two or more magnetic layers provided on a support, wherein an easily magnetizable axis of an uppermost magnetic layer and an easily magnetizable axis of a lower magnetic layer are oriented in directions crossing each other at right angles.

(2) The magnetic recording medium according to claim (1), wherein the easily magnetizable axis of the uppermost magnetic layer is oriented in a width direction and the easily magnetizable axis of the lower magnetic layer is oriented in a length direction.

(3) The magnetic recording medium according to claim (1) or (2), wherein a thickness of the uppermost magnetic layer is from $1/10$ to 1 time the shortest recording wavelength for recording a data signal in the uppermost magnetic layer, a coercive force Hc of the uppermost magnetic layer is from 158 KA/m to 316 KA/m, and a residual magnetic flux density Br of the lower magnetic layer is from 2,500 G to 5,000 G.

(4) The magnetic recording medium according to any one of claims (1) to (3), wherein a non-magnetic layer containing a non-magnetic powder is provided under the two or more magnetic layers.

(5) A signal recording system which comprises recording a data signal in a width direction in the uppermost magnetic layer of the magnetic recording medium claimed in any one of claims (1) to (4) and recording a servo signal in a length direction in the lower magnetic layer.

DETAILED DESCRIPTION OF THE INVENTION

Preferred embodiments of the magnetic recording medium according to the invention will be described hereinafter.

[Uppermost Magnetic Layer]

The Hc of the uppermost magnetic layer is preferably from 158 KA/m to 316 KA/m, more preferably from 174 KA/m to 237 K/m. When the HC of the uppermost magnetic layer is too low, C/N of data signal is low. On the contrary, when the Hc of the uppermost magnetic layer is to high, the magnetic intensity of the recording head must be increased, and a servo signal recorded on the lower layer tends to be erased.

The thickness of the uppermost magnetic layer is preferably from $1/10$ to 1 time, more preferably from $1/8$ to 0.6 times the shortest recording wavelength of data signal. When the thickness of the uppermost magnetic layer is too small, the intensity of data signal is too small, and servo signal can be easily erased during data recording. On the contrary, when the thickness of the uppermost magnetic layer is too great, the intensity of servo signal is too small.

In the case where the magnetic layer consists of two layers, an upper magnetic layer is the uppermost magnetic layer. In the case wherein the magnetic layer consists of three or more layers, a top magnetic layer is the uppermost magnetic layer.

[Lower Magnetic Layer]

The Hc of the lower magnetic layer is preferably almost equal to that of the uppermost magnetic layer.

The residual magnetic flux density Br (hereinafter referred simply to as "Br" sometimes) of the lower magnetic layer is preferably great to increase the output of servo signal and normally is preferably from 2,500 G to 5,000 G.

The thickness of the lower magnetic layer is preferably from 0.05 $\mu$m to 3 $\mu$m, more preferably from 0.05 $\mu$m to 2 $\mu$m, even more preferably from 0.1 $\mu$m to 1 $\mu$m. When the thickness of the lower magnetic layer is too small, the intensity of servo signal is reduced. On the contrary, when the thickness of the lower magnetic layer is too great, the resulting resolution is reduced By orienting the easily magnetizable axis of the uppermost magnetic layer and the easily magnetizable axis of the lower magnetic layer in directions crossing each other at right angles, e.g., orienting the easily magnetizable axis of the uppermost magnetic layer in a width direction and the easily magnetizable axis of the lower magnetic layer in a length direction, the effect of magnetization of the lower magnetic layer on the uppermost magnetic layer can be lessened.

When at least three magnetic layers exist as magnetic layers, the magnetic layer(s) other than the uppermost magnetic layer and the servo write layer (i.e., lower magnetic layer for recording servo signals) preferably has/have a lower Hc than the servo write layer.

The servo write layer may be provided just under or indirectly under the information recording layer.

[Non-Magnetic Layer]

In the case where the thickness of the lower magnetic layer is reduced, a non-magnetic layer having a thickness of from 0.3 to 3 μm containing a non-magnetic powder can be provided under the lower magnetic layer to smoothen the magnetic layer, allowing recording at a higher density.

[Magnetic Powder]

As the magnetic powder to be incorporated into the uppermost magnetic layer and lower magnetic layer there may be used a permanent magnet material powder such as powder of acicular alloy mainly composed of Fe, hexagonal ferrite powder, SmCo powder, FePt powder and MnAl powder. Regarding the size of the magnetic powder, if it is acicular, an average major axis thereof is from 0.03 to 0.15 μm, preferably from 0.04 to 0.1 μm and a crystallite size thereof is from 70 to 180 angstroms, preferably from 80 to 150 angstroms. If it is hexagonal ferrite powder, a tabular diameter thereof is from 10 to 50 nm, preferably from 15 to 40 nm and a tabular thickness thereof is from 5 to 15 nm, preferably from 7 to 12 nm. Also, if it is granular, a diameter thereof is from 5 to 50 nm, preferably from 8 to 35 nm.

The Hc of the magnetic layer is governed by the magnetic characteristics of the magnetic powder to be incorporated therein. Accordingly, the Hc of the uppermost magnetic layer is controlled by the Hc of the magnetic powder used. The Br of the lower magnetic layer is controlled by the σs of the magnetic powder and the amount of binder.

[Binder]

The binders used for the magnetic layers (uppermost and lower layers) and the non-magnetic layer in the invention may be any of known thermoplastic resins, thermosetting resins, reactive resins or mixtures of these resins. The thermoplastic resins usable as binders include resins whose glass transition temperatures are in the range of −100 to 150° C., whose number average molecular weights are in the range of 1,000 to 200,000, preferably 10,000 to 100,000, and whose polymerization degrees are in the range of about 50 to about 1,000. Examples of such thermoplastic resins include homopolymers and copolymers containing constituent units derived from monomers such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether, polyurethane resins and various resins of rubber type. Examples of the thermosetting resins and reactive resins include phenol resin, epoxy resin, polyurethane resin, urea resin, melamine resin, alkyd resin, acrylic reactive resin, formaldehyde resin, silicone resin, epoxy-polyamide resin, a mixture of polyester resin and isocyanate prepolymer, a mixture of polyester-polyol and polyisocyanate, and a mixture of polyurethane and polyisocyanate.

Details of these resins are described, e.g., in *Plastics Handbook,* published by Asakura Shoten.

It is also possible to use known electron beam-curable resins in the non-magnetic layer and the magnetic layers. Examples of such resins and manufacturing methods thereof are described in detail in JP-A-62-256219. The resins as described above can be used alone or as a combination of two or more thereof. Examples of the resin combination include a combination of polyurethane resin and at least one vinyl chloride-based resin selected from vinyl chloride resin, vinyl chloride-vinyl acetate copolymer, vinyl chloride-vinyl acetate-vinyl alcohol copolymer and vinyl chloride-vinyl acetate-maleic anhydride copolymer, and a combination of polyisocyanate with the combination as described above. The polyurethane resins used include those known, for example, polyesterpolyurethane, polyetherpolyurethane, polyetherpolyesterpolyurethane, polycarbonatepolyurethane, polyesterpolycarbonatepolyurethane and polycaprolactone-polyurethane. For enhancing dispersibility and durability, it is preferred to use a binder resin having at least one polar group selected from —COOM, —SO$_3$M, —OSO$_3$M, —P=O (OM)$_2$, —O—P=O (OM)$_2$ wherein M is a hydrogen atom or an alkali metal base), —OH, —NR$_2$, —N$^+$R$_3$ (wherein R is a hydrocarbon group), epoxy group, —SH or —CN prepared by introducing such polar groups into each of the binder resins described above by copolymerization or addition reaction, if desired. The content of such polar groups in the binder is from $10^{-1}$ to $10^{-8}$ mole/g, preferably from $10^{31\ 2}$ to $10^{-6}$ mole/g.

Examples of those binders usable in the invention include VAGH, VYHH, VMCH, VAGF, VAGD, VROH, VYES, VYNC, VMCC, XYHL, XYSG, PKHH, PKHJ, PKHC and PKFE produced by Union Carbide Co., MPR-TA, MPR-TA5, MPR-TAL, MPR-TSN, MPR-TMF, MPR-TS, MPR-TM and MPR-TAO produced by Nissin Chemical Industry Co., Ltd., 1000W, DX80, DX81, DX82, DX83 and 100P produced by Denki Kagaku Kogyo K.K., M-105, MR110, MR100 and 400X-110A produced by Nippon Zeon Co., Ltd., Nipporan N2301, N2302 and N2304 produced by Nippon Polyurethane Industry Co., Ltd., Pandex T-5105, T-R$_{3080}$ and T-5201, Barnoc D-400 and D-210-80, and Crysbon 6109 and 7209 produced by Dainippon Ink & Chemicals, Inc., Vylon UR$_{8200,}$ UR$_{8300,}$ UR-8600, UR-5500, UR-4300, RV530 and RV280 produced by Toyobo Co., Ltd., Daiferamine 4020, 5020, 5100, 5300, 9020, 9022 and 7020 produced by Dainichiseika C. & C. Mfg. Co., Ltd., MX5004 produced by Mitsubishi Chemical Industries Ltd., Sanprene SP-150, TIM-3003 and TIM-3005 produced by Sanyo Chemical Corp., and Saran F310 and F210 produced by Asahi Chemical Industry Co., Ltd.

In the present magnetic layers, the binder is used in a proportion of 2 to 50 weight %, preferably 10 to 30 weight %, to the ferromagnetic powder used. More specifically, it is preferred to use as the binder a vinyl chloride copolymer in a proportion of 5 to 30 weight %, polyurethane resin in a proportion of 2 to 20 weight % and polyisocyanate in proportion of 2 to 20 weight % in combination. In the case of using polyurethane as a binder in the invention, it is preferred that the polyurethane has a glass transition temperature of −50 to 100° C., a breaking elongation of 100 to 2,000%, a breaking stress of 0.05 to 10 kg/cm$^2$, and a yield point of 0.05 to 10 kg/cm$^2$. The present magnetic recording medium is constructed of at least two layers. Therefore, needless to say, it is possible to vary the binder content, the proportions of vinyl chloride resin, polyurethane resin, polyisocyanate and other resins in the binder, the molecular weight and polar group content of each of resins forming the magnetic layer, or the physical characteristics of the resins as described above among the constituent layers including the non-magnetic layer, the uppermost magnetic layer and other lower magnetic layers, if needed. In this case, known arts of multiple magnetic layers are applicable. In the case of using different amounts of binders in the upper and lower magnetic layers and the non-magnetic layer respectively, for instance, it is effective to increase a binder content in the uppermost magnetic layer for reduction of abrasion at the magnetic layer surface, and an improved head touch on the recording medium can be achieved by increasing the binder content in the magnetic layers other than the uppermost magnetic layer or the non-magnetic layer and imparting flexibility to the magnetic recording medium.

Examples of the polyisocyanate usable in the invention include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates. Commercially available products of the isocyanates include, e.g., Colonate L, Colonate HL, Colonate 2030, Colonate 2031, Millionate MR and Millionate MTL produced by Nippon Polyurethane Industry Co., Ltd., Takenate D-102, Takenate D-110N, Takenate D-200 and Takenate D-202 produced by Takeda Chemical Industries, Ltd., and Desmodur L, Desmodur IL, Desmodur N and Desmodur HL produced by Sumitomo Bayer Co., Ltd. In each of the non-magnetic layer and the magnetic layers, these products may be used alone or as a combination of at least two products utilizing a difference in curing reactivity.

[Non-Magnetic Powder]

Non-magnetic powders used in the present non-magnetic layer can be selected from inorganic compounds, such as metal oxides, metal carbonates, metal sulfates, metal nitrides, metal carbides and metal sulfides. More specifically, aluminium oxide having an α-alumina content of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide can be used alone or as combinations of two or more thereof. Of these compounds, titanium dioxide, zinc oxide, iron oxide and barium sulfate are preferably used. In particular, titanium dioxide is preferred. The particle size of the non-magnetic powders is in the range of 0.005 to 2 $\mu$m. If desired, adjustment to such a particle size range may be made by combined use of non-magnetic powders differing in average particle size or independent use of a non-magnetic powder having a broad size distribution, thereby obtaining similar effects. In particular, the inorganic powders ranging in particle size from 0.01 to 0.2 $\mu$m are preferred. The tap density is from 0.05 to 2 g/ml, preferably from 0.2 to 1.5 g/ml. The water content is in the range of 0.1 to 5 weight %, preferably 0.2 to 3 weight %. The pH is from 2 to 11, and the pH range of 6 to 9 is preferred in particular. The specific surface area is in the range of 1 to 100 m$^2$/g, preferably 5 to 50 m$^2$/g, more preferably 7 to 40 m$^2$/g. The suitable crystallite size is from 0.01 to 2 $\mu$m. The oil absorptive capacity using dibutyl phthalate (DBP) is in the range of 5 to 100 ml/100 g, preferably 10 to 80 ml/100 g, more preferably 20 to 60 ml/100 g. The specific gravity is from 1 to 12, preferably from 3 to 6. Those non-magnetic powders may have any of acicular, spherical, polyhedral and tabular shapes. It is preferred that the ignition loss is at most 20 weight %. The Mohs hardness of the inorganic powder used in the invention is at least 4. It is preferred that those non-magnetic powders have the surface roughness factor in the range of 0.8 to 1.5, more preferably 0.9 to 1.2. The amount of stearic acid (SA) adsorbed is in the range of 1 to 20 $\mu$mol/m$^2$, preferably 2 to 15 $\mu$mol/m$^2$. It is preferred that the non-magnetic powders have heat of wetting with 25° C. water in the range of 200 to 600 erg/cm$^2$. It is also possible to use a solvent so far as the non-magnetic powders have heat of wetting with the solvent in the foregoing range. Further, it is appropriate that the quantity of water molecule present on the powder surface at 100 to 400° C. is from 1 to 10 molecules per 100 Å. It is preferred to use non-magnetic powders the pH of which is in the range of 3 to 6 at the isoelectric point in water.

It is preferred to treat the surfaces of the non-magnetic powders with $Al_2O_3$, $SiO_2$, $TiO_2$, $ZrO_2$, $SnO_2$, $Sb_2O_3$ or ZnO. Of those oxides, $Al_2O_3$, $SiO_2$, $TiO_2$ and $ZrO_2$, especially $Al_2O_3$, $SiO_2$ and $ZrO_2$, are preferred from the viewpoint of dispersibility. These oxides may be used in combination or independently. For instance, such a surface treatment layer may be formed by coprecipitation of the desired oxides, or by providing an alumina layer first and then silica layer, or vise versa. In addition, the surface treatment layer formed may be porous depending on the intended purposes, but it is ordinarily preferred that the layer is uniform and dense.

Examples of non-magnetic powder usable in the invention include UA5600 and UA5605 produced by Showa Denko K.K., AKP-20, AKP-30, AKP-50, HIT-55, HIT-100 and ZA-G1 produced by Sumitomo Chemical Co., Ltd., G5, G7 and S-1 produced by Nippon Chemical Industrial Co., Ltd., TF-100, TF-120, TF-140 and $R_{516}$ produced by Toda Kogyo Corp., TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 produced by Ishihara Sangyo Co., Ltd., ECT-52, STT-4D, STT-30D, STT-30 and STT-65C produced by Titan Kogyo K.K., T-1 produced by Mitsubishi Materials Corp., NS-O, NS-3Y and NS-8Y produced by Nippon Shokubai Co., Ltd., MT-100S, MT-100T, MT-150W, MT-500B, MT-600B and MT-100F produced by Tayca Corp., FINEX-25, BF-1, BF-10, BF-20, BF-1L and BF-10P produced by Sakai Chemical Industry Co., Ltd., DEFIC-Y and DEFIC-R produced by Dowa Mining Co., Ltd., and Y-LOP produced by Titan Kogyo K.K., and burned products thereof.

Of those non-magnetic powders, titanium dioxide is preferred in particular. So the manufacturing methods thereof are described below in detail. As typical manufacturing methods of titanium dioxide, there are known a sulfuric acid method and a chlorine method. According to the sulfuric acid method, ilmenite as a raw ore is digested with sulfuric acid, and therefrom Ti and Fe are extracted as sulfates. From the extract, the iron sulfate is separated by crystallization, and the residual titanyl sulfate solution is purified by filtration. Then, the filtrate is hydrolyzed under heating to precipitate hydrated titanium dioxide. The precipitate is filtered off and washed, and therefrom impurities are removed by further washing. After addition of a grain-size modifier, the hydrated titanium oxide is burned at 80 to 1,000° C. to yield crude titanium dioxide. Whether the crude product obtained is rutile-type titanium dioxide or anatase-type titanium oxide depends on the kind of a nucleating agent added at hydrolysis. The crude titanium dioxide is ground, classified, and then subjected to surface treatment. Thus, the intended titanium dioxide is obtained. In the chlorine method, on the other hand, natural or synthetic rutile is used as raw ore. The ore is subjected to chloridization at a high temperature in a reductive condition, and thereby Ti and Fe in the ore are converted into $TiCl_4$ and $FeCl_2$ respectively. Upon cooling, the $FeCl_2$ is solidified, and separated from liquid $TiCl_4$. The crude $TiCl_4$ thus obtained is purified by rectification, and thereto a nucleation agent is added. Then, it is made to instantaneously react with oxygen at a temperature of 1,000° C. or higher to yield crude titanium dioxide. To the crude titanium dioxide produced in the oxidative decomposition process, pigment properties are imparted by the same finishing treatment as in the sulfuric acid method. The surface treatment for finishing comprises the following steps: The crude titanium dioxide is ground in a dry condition, admixed with a dispersing agent and water, ground in a wet condition, and then centrifuged to separate coarse grains. Then, the slurry of fine grains is transferred into a surface treatment tank, and surface coating with metal hydroxide is performed. Specifically, the prescribed amount of aqueous solution containing a salt of Al, Si, Ti, Zr, Sb, Sn, or Zn is added to the slurry, and thereto an acid or an alkali is added for neutralization. Thus, the titanium dioxide grain surface is coated with the hydrated oxide(s) produced. The removal of water-soluble salt(s) as by-product(s) is effected by decantation, filtration and washing. The resulting slurry is subjected to pH adjustment, filtration and washing with pure water. The thus washed cake is dried with a spray dryer or a band dryer. The thus dried cake is ground with a jet mill to yield a final product. In addition to the aqueous system described above, $AlCl_3$ or $SiCl_4$ vapor is admitted through titanium dioxide powder and then steam is introduced therein to conduct the surface treatment with Al or Si.

Examples of organic powder as non-magnetic powder usable in the invention include acrylic-styrene resin powder, benzoguanamine resin powder, melamine resin powder, phthalocyanine pigments, polyolefin resin powder, polyester resin powder, polyamide resin powder, polyimide resin powder and polyfluoroethylene resin powder. The methods which can be adopted for manufacturing those powders are disclosed in JP-A-62-18564 and JP-A-60-255827.

The ratio of the non-magnetic powders to the binder used together ranges from 20:1 to 1:10 by weight and from 10:1 to 1:10 by volume. In particular, it is preferred that the volume of the binder is from 2 to 0.3 times the volume of the powders in the non-magnetic layer.

[Carbon Black]

Examples of carbon black usable in the present magnetic layers include furnace black for rubber use, thermal black for rubber use, carbon black for color use and acetylene black. It is preferred to use carbon black having its specific surface area in the range of 5 to 500 $m^2/g$, its DBP absorptive capacity in the range of 10 to 400 ml/100 g, its average particle size in the range of 5 to 300 m$\mu$, its pH in the range of 2 to 10, its water content in the range of 0.1 to 10 weight % and its tap density in the range of 0.1 to 1 g/ml. Specific examples of the carbon black usable in the invention include BLACKPEARLS 2000, 1300, 1000, 900, 800 and 700, and VULCAN XC-72 produced by Cabot Corp., #80, #60, #55, #50 and #35 produced by Asahi Carbon Co., Ltd., #2400B, #2300, #900, #1000, #30, #40 and #10B produced by Mitsubishi Chemical Corp., and CONDUCTEX SC and RAVEN 150, 50, 40 and 15 produced by Columbian Chemical Co.

In advance of its use, the carbon black may be surface-treated with a dispersing agent, a resin may be grafted on the carbon black, or the carbon black surface may be partly converted into graphite. Also, the carbon black may be dispersed into a binder before it is added to the magnetic coating composition. The carbon black can be used alone or as a combination. When the carbon black is mixed in the magnetic layer, a preferred proportion of carbon black to the ferromagnetic powder is from 0.1 to 30 weight %. The carbon black used in the magnetic layer has functions of preventing electrification, reducing a friction coefficient, imparting light-shielding property and increasing the film strength. The function of carbon black may be varied depending on the nature of the carbon black used. Therefore, the kind, amount and combination of carbon black used in the uppermost magnetic layer and the lower magnetic layer can be appropriately selected on the basis of the foregoing properties, such as the particle size, oil absorption, conductivity and pH to suite individual purposes of those layers. Details of the carbon black usable in the present invention can be referred, e.g., to *Carbon Black Binran* (*which may be translated by the English title "Handbook of Carbon Black"*), compiled by Carbon Black Association.

Examples of carbon black usable in the present non-magnetic layer include furnace black for rubber use, thermal black for rubber use, carbon black for color use and acetylene black. It is appropriate to use carbon black having its specific surface area in the range of 100 to 500 $m^2/g$, preferably 150 to 400 $m^2/g$, and its DBP absorptive capacity in the range of 20 to 400 ml/100 g, preferably 30 to 200 ml/100 g. The average particle size of the carbon black used is from 5 to 80 m$\mu$m (=nm), preferably from 10 to 50 m$\mu$m, more preferably from 10 to 40 m$\mu$m. Further, it is preferred that the pH, water content and tap density of the carbon black used are from 2 to 10, from 0.1 to 10 weight % and from 0.1 to 1 g/ml, respectively. Specific examples of the carbon black usable in the invention include BLACKPEARLS 2000, 1300, 1000, 900, 800, 880 and 700, and VULCAN XC-72 produced by Cabot Corp. #3050B, #3150B, #3250B, #3750B, #3950B, #950, #650, #970B, #850B and MA-600 produced by Mitsubishi Chemical Corp., CONDUCTEX SC and RAVEN 8800, 8000, 7000, 5750, 5250, 3500, 2100, 2000, 1800, 1500, 1255 and 1250 produced by Columbian Chemical Co., and Ketjen Black EC produced by Akuzo Co.

In advance of its use, the carbon black may be surface-treated with a dispersing agent, a resin may be grafted on the carbon black, or the carbon black surface may be partly converted into graphite. Also, the carbon black may be dispersed into a binder before it is added to the coating composition.

The carbon black can be used in a proportion not more than 50 weight % to the non-magnetic powder as described above, and that not more than 40 weight % to the total weight of the non-magnetic layer. The carbon black as described above may be used alone or as combinations. Details of the carbon black usable in the present invention can be referred, e.g., to *Carbon Black Binran* (*which may be translated by the English title "Handbook of Carbon Black"*), compiled by Carbon Black Association.

[Abrasive]

Examples of the abrasives usable in the invention include known materials having Mohs hardness of at least 6, such as alumina having an α-alumina content of at least 90%, β-alumina, silicon carbide, chromium oxide, cerium oxide, α-iron oxide, corundum, artificial diamond, silicon nitride, titanium carbide, titanium dioxide, silicon dioxide and boron nitride. These abrasives can be used alone or as combinations. Further, these abrasives may be used in the form of complex (obtained by treating surface of one abrasive with another abrasive). Although those abrasives may sometimes contain compounds or elements other than their main components, they can function as abrasives as far as the proportion of their respective main components is 90 weight % or more. The average particle size of those abrasives is preferably from 0.01 to 2 $\mu$m. Adjustment to the particle size range may be made by combined use of abrasives having different particle sizes or independent use of an abrasive having a broad particle size distribution, if desired. It is advantageous that the abrasives used have their tap density in the range of 0.3 to 2 g/ml, their water content in the range of 0.1 to 5 weight %, their pH in the range of 2 to 11 and their specific surface area in the range of 1 to 30 m$^2$/g. The abrasives used in the invention may have any of acicular, spherical and cubic shapes. However, shapes sharpened in parts are advantageous from the viewpoint of abrasive capability. Examples of commercially available abrasives include AKP-20, AKP-30, AKP-50, HIT-50 and HIT-100 produced by Sumitomo Chemical Co., Ltd., G-5, G7 and S-1 produced by Nippon Chemical Industrial Co., Ltd., and TF100 and TF140 produced by Toda Kogyo Corp. Needless to say, it is possible to change abrasives added to the magnetic layers (upper and lower layers) and the non-magnetic layer, respectively, in kind, amount added and combination so as to suit the intended purpose. Those abrasives may be dispersed in advance into a binder and added to the magnetic coating composition. The number of abrasives present on the surface and sides of the magnetic layer of the magnetic recording medium of the invention is preferably at least 5 per 100 $\mu$m$^2$.

[Other Additives]

Compounds having a lubricating effect, an antistatic effect, a dispersing effect or a plasticizing effect can be used as other additives for the magnetic layers (uppermost and lower layers) and non-magnetic layer of the present magnetic recording medium. Examples of the compounds usable as such additives include molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkylphosphoric acid ester and alkali metal salts thereof, alkylsulfuric acid ester and alkali metal salts thereof, polyphenyl ether, fluorine-containing alkylsulfuric acid ester and alkali metal salts thereof, monobasic fatty acid containing 10 to 24 carbon atoms (which may contain unsaturated bonds or may be branched) and metal salts of such a fatty acid (e.g., Lit Na, Ka and Cu salts), monohydric to hexahydric alcohol each containing 12 to 22 carbon atoms (which may have unsaturated bonds or may be branched), alkoxyalcohol containing 12 to 22 carbon atoms (which may have unsaturated bonds or branched chains), mono-, di- or trifatty acid ester produced by reaction of monobasic fatty acid containing 10 to 24 carbon atoms (which may have unsaturated bonds or may be branched) with one kind of alcohol chosen from monohydric to hexahydric alcohols each containing 2 to 12 carbon atoms (which may have unsaturated bonds or may be branched), ester of fatty acid and polyalkylene oxide monoalkyl ether, fatty acid amide containing 8 to 22 carbon atoms, and aliphatic amine containing 8 to 22 carbon atoms.

Specific examples of the compounds includes lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, non-ionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acidic groups such as carboxyl, sulfo, phospho, sulfate and phosphate groups, and amphoteric surfactants, such as amino acids, aminosulfonic acids, sulfuric or phosphoric acid esters of aminoalcohols, and alkyl betaine-type surfactants, can be used.

Details of the surfactants are described in *Kaimen Kasseizai Binran* (*which maybe translated by the English title "Handbook of Surfactants"*), published by Sangyo Tosho K.K. The lubricants and antistatic agents as recited above are not always required to be pure, but may contain impurities, such as isomers, unreacted materials, by-products, decomposed matter and oxides. The content of such impurities is preferably 30 weight % or below, more preferably 10 weight % or below.

In the invention, it is possible to change the kinds and the amounts of lubricant and surfactant added to meet requirements for each of the non-magnetic and magnetic layers individually. For instance, it is thought that the use of fatty acids having different melting points in the non-magnetic layer and the magnetic layers permits controlling the ooze of the fatty acids from the layer surface, the use of esters having different boiling points and polarities in the non-magnetic layer and the magnetic layers permits controlling the ooze of the esters from the layer surface, adjustment of amounts of surfactants added to the non-magnetic layer and the magnetic layers enables enhancement of coating stability, and the lubricating effect can be elevated by adding a greater amount of lubricant to the non-magnetic layer. Needless to say, the cases described above should not be construed as limiting the scope of the invention. All or a part of additives used in the invention may be added in any step of process for preparing the magnetic coating composition. For instance, there may be cases where the additives are mixed with the ferrogmagnetic powder prior to the kneading process, they are added during the process of kneading the ferromagnetic powder, binder and solvent, they are added in the process of dispersion, they are added after the dispersion process, and they are added just before coating. On the other hand, simultaneous or successive application of all or a part of the additives to an already formed magnetic layer sometimes allows the desired purposes to be achieved. Further, in some cases, the magnetic layer surface may be coated with a lubricant after calendering or slitting operation.

Examples of commercially available lubricant products include NAA-102, NAA-415, NA-312, N-160, NAA-180, NAA-174, NAA-175, NAA-222, NAA-34, NAA-35, NAA-171 =AA-122, NAA-142, NAA-160, NAA-173K, caster oil-hydrogenated fatty acid, N-42, NAA-44, Cation SA, Cation MA, Cation AB, Cation BB, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OPO-85R, Nonion LT-221, Nonion ST-221, Nonion OT-221, Monogly MB, Nonion DS-60, Anon BF and Anon LG, butyl stearate, butyl laurate and erucic acid produced by NOF Corp., olleic acid produced by Kanto Kagaku Co., Ltd., FAL-205 and FAL-123 produced by Takemoto Oil & Fat Co., Ltd., TA-3, KF96, KF-96L, KF96H, KF410, KF420, KF965, KF54, KF50, KF56, KF907, KF851, X-22-819, X-22-822, KF905, KF700, KF393, KF857, KF860, KF865, X-22-980, KF-101, KF-102, KF-103, X-22-3710, X-22-3715, KF-910, and KF-3935 produced by Etsu Chemical Co., Ltd., and Duomine TDO produced by Lion Corp., BA-41G produced by Nisshin Oil Mills, Ltd.

[Organic Solvent]

In coating compositions for forming the present magnetic layers (uppermost and lower layers) and non-magnetic layer, organic solvents can be used in an appropriate proportion. Examples of the organic solvents usable include ketones such as acetone, methyl ethyl ketone, methyl isobutyl ketone, diisobutyl ketone, cyclohexanone, isophorone and tetrahydrofuran, alcohols such as methanol, ethanol, propanol, butanol, isobutyl alcohol, isopropyl alcohol and methylcyclohexanol, esters such as methyl acetate, butyl acetate, isobutyl acetate, isopropyl acetate, ethyl lactate and glycol acetate, glycol ethers such as glycol dimethyl ether, glycol monoethyl ether and dioxane, aromatic hydrocarbons such as benzene, toluene, xylene, and cresol and chlorobenzene, chlorinated hydrocarbons such as methylene chloride, ethylene chloride, carbon tetrachloride, chloroform, ethylene chlorohydrin and dichlorobenzene, N,N-dimethylformamide and hexane. These organic solvents may not always be 100% pure products, but may contain impurities including isomers, unreacted materials, by-products, decomposed matter, oxides and water. It is preferred that the proportion of such impurities is preferably at most 30%, more preferably at most 10%. In the invention, it is preferred that the organic solvents used in the magnetic layers (uppermost and lower layers) and the non-magnetic layer are same in kind. However, the solvent used may be different in amount between the magnetic and non-magnetic layers. For the non-magnetic layer, a solvent having high surface tension (e.g., cyclohexanone or dioxane) is used to improve the coating stability. Specifically, it is essential that the arithmetic mean of a solvent composition of the uppermost layer be higher than that of the lower layer. In order to enhance dispersibility, it is preferred for the solvent to have a high polarity to some extent, and the solvent composition containing solvents having dielectric constants of 15 or above in an amount of at least 50 is preferred. In addition, the solubility parameter of solvents used is preferably from 8 to 11.

[Thickness of Magnetic Recording Medium]

As to the thickness of the present magnetic recording medium, the thickness of a non-magnetic flexible support used is from 1 to 100 $\mu$m, preferably 4 to 80 $\mu$m, and the total thickness of magnetic and non-magnetic layers is from 1/100 to 2 times the thickness of the non-magnetic flexible support. Further, an under-coat layer may be provided between the non-magnetic flexible support and the non-magnetic layer for the purpose of adhesion improvement. The thickness of the under-coat layer is from 0.01 to 2 $\mu$m, preferably from 0.02 to 0.5 $\mu$m. In addition, the non-magnetic support may be coated with a backing layer on the side opposite to the magnetic layer. The thickness of the backing layer is from 0.1 to 2 $\mu$m, preferably from 0.3 to 1.0 $\mu$m. Known compositions for the under-coat and backing layers are usable in the invention.

[Support]

The support used in the invention may be any of supports hitherto used for magnetic recording media. Considering its magnetic layer-supporting role, the support is preferably a non-magnetic material. When the present magnetic recording medium is a magnetic tape, flexibility is required for the support, so a non-magnetic flexible support is ordinarily used. The recording system of the invention is actually effected in the form of magnetic tape. In practice, therefore, a non-magnetic flexible support is used.

Non-magnetic flexible supports usable in the invention include known films of polyesters such as polyethylene terephthalate and polyethylene naphthalate, polyolefins, cellulose triacetate, polycarbonate, polyamide, polyimide, polyamideimide, polysulfone, aramide and aromatic polyamide.

These support materials may undergo in advance corona discharge, plasma treatment, adhesion-increasing treatment, heat treatment and dust removal treatment. For attaining the present object, it is required for the support used in the invention to have a center-line average surface roughness (cut-off value: 0.25 mm) of at most 0.03 $\mu$m, preferably at most 0.02 $\mu$m, more preferably at most 0.01 $\mu$m. Besides being small in center-line average surface roughness, the present support is preferably free of coarse projections measuring 1 $\mu$m or above in height. The surface roughness dimensions can be adjusted freely by selecting sizes and amounts of fillers added to the support, if desired. Examples of such fillers include oxides and carbonates of Ca, Si and Ti, and organic fine powders such as particulate acrylic resin. The F-5 values of non-magnetic support used in the invention are preferably from 5 to 50 kg/mm$^2$ in the taperunning direction and preferably from 3 to 30 kg/mm$^2$ in the tape traverse direction (width direction). In general, the F—5 value is larger in the tape running direction than in the tape traverse direction. However, this needs not apply in special cases where the necessity of increasing the strength in the traverse direction arises.

The thermal shrinkage ratio of the support in both taperunning and traverse directions is preferably at most 3%, more preferably at most 1.5%, under heating at 100° C. for 30 minutes, and preferably at most 1%, more preferably at most 0.5%, under heating at 80° C. for 30 minutes. It is preferred for the support to have its breaking strength in the range of 5 to 100 kg/mm$^2$ in both the directions and its elastic modulus in the range of 100 to 2,000 kg/mm$^2$.

[Preparation Process of Coating Compositions]

The process of preparing coating compositions for forming constituent layers of the present magnetic recording medium, inclusive of the magnetic layers (uppermost and lower layers) and the non-magnetic layer, comprises a kneading step, a dispersing step and mixing steps provided before or after those steps, if desired. Each step may be constituted of at least two stages. Each of ingredients used for coating compositions, such as a ferromagnetic powder, a nonmagnetic powder, a binder, carbon black, an abrasive, an antistatic agent, a lubricant and a solvent, may be added at the beginning or in the course of every step. In addition, each ingredient may be divided into two or more portions, and added in separate steps. For instance, polyurethane resin may be separately added in the kneading step, dispersing step and mixing step for viscosity adjustment after the dispersion.

It goes without saying that hitherto known techniques for production may be applied to some steps in order to attain the present object. The use of a mighty kneading machine, such as a continuous kneader or a pressurized kneader, at the kneading step can ensure high residual magnetic flux density (Br) in the present magnetic recording medium. The details of kneading treatment are described in JP-A-1-106338 and JP-A-64-79274. On the other hand, in the case of preparing a coating composition for forming a non-magnetic layer, it is desirable to use a dispersion medium greater in specific gravity, and zirconia beads are suitable as such a dispersion medium.

[Coating Machine and Coating Method]

Examples of a coating machine and method applicable to production of the present magnetic recording medium having a multilayer structure are described below:

(1) A lower layer is coated first by the use of a coating machine usually applied in coating magnetic coating compositions, such as a gravure, roll, blade or extrusion coater. And while the lower layer is in a wet condition, the upper layer is coated thereon by the use of a pressurized support type extrusion coating machine as disclosed in JP-B-1-46186 (the term "JP-B" as used herein means an "examined Japanese patent publication), JP-A-60-238179 and JP-A-2-265672.

(2) An upper layer and a lower layer are coated almost simultaneously by the use of a coating head having 2 slits for passage of coating compositions as disclosed in JP-A-63-88080, JP-A-2-17971 and JP-A-2-265672.

(3) An upper layer and a lower layer are coated almost simultaneously by the use of a backup roll-attached extrusion coating machine as disclosed in JP-A-2-174965.

In addition, it is desirable to apply a sheering stress to the coating composition in the interior of a coating head by the use of the method disclosed in JP-A-62-95174 or JP-A-1-236968 for the purpose of preventing electromagnetic characteristics of the magnetic recording medium to be formed from degrading due to agglomeration of magnetic particles. Further, it is preferred that the coating compositions have their viscosity in the numerical range disclosed in JP-A-3-8471. In the process of producing a magnetic recording medium according to the invention, it is preferred to perform treatment for creating a strongly oriented state in the recording medium. For effecting such a treatment, it is appropriate to apply a magnetic field generated from a combination of solenoid of at least 1,000 G and cobalt magnet of at least 2,000 G placed so that the same poles thereof face each other, and further to provide a moderately drying step prior to the orientation treatment step so as to attain the optimum orientation after drying. In the case of a magnetic disk as an embodiment of the invention, on the other hand, it is rather required to perform orientation treatment for randomizing the orientation. Further, in order to vary the orientation direction from the uppermost magnetic layer to the lower magnetic layer, it is not always necessary for the orientation direction to be in the length direction, and that in-plane direction, but the orientations in the vertical direction and the traverse direction may be adopted.

Furthermore, a heat-resistant plastic roll, such as a roll made from epoxy resin, polyimide, polyamide or polyimideamide, is used in calendering treatment. A pair of metal rolls can also be used for the treatment. The treatment temperature is preferably not lower than 70° C., more preferably 80° C. or above, and the suitable linear pressure applied is preferably at least 200 kg/cm, more preferably at least 300 kg/cm. The coefficients of friction of the magnetic layer surface and the backing layer surface of the present magnetic recording medium against SUS 420J is preferably 0.5 or below, more preferably 0.3 or below, and the surface resistibility is preferably from $10^4$ to $10^{12}$ Ω/sq. The elastic modulus of the magnetic layer under 0.5% elongation is from 100 to 2,000 kg/mm² in each of running and traverse directions, and the breaking strength is preferably from 1 to 30 kg/cm². The elastic modulus of the magnetic recording medium in each of running and traverse directions is preferably from 100 to 1,500 kg/mm², the residual elongation is preferably at most 0.5%, and the thermal shrinkage ratio at all temperatures of no higher than 100° C. is preferably at most 1%, more preferably at most 0.5%, still more preferably at most 0.1%. The glass transition temperature of the magnetic layer (the maximum point of loss elastic modulus in the kinetic viscoelasticity measurement made at 110 Hz) is preferably from 50° C. to 120° C., and that of the non-magnetic layer is preferably from 0° C. to 100° C. The loss elastic modulus is preferably from $1 \times 10^8$ to $8 \times 10^9$ dyne/cm², and the loss tangent is preferably at most 0.2. When the loss tangent is too great, a tackiness trouble tends to occur.

The content of residual solvent in the magnetic layer is preferably 100 mg/m² or below, more preferably 10 mg/m² or below, and it is advantageous that the residual solvent content in the second layer (i.e., the uppermost magnetic layer) is lower than that in the first layer (i.e., the lower magnetic layer). The porosity of non-magnetic layer and that of magnetic layer are both preferably 30 volume % or below, more preferably 20 volume % or below. The smaller porosity is more favorable for achieving high output, but the porosity may be increased up to a point depending on the desired purpose. For instance, in the case of repetition use-oriented magnetic media for data recording, the greater porosity is more favorable for ensuring running durability. As to the magnetic characteristics of the present magnetic recording medium, the squareness ratio in the tape-running direction is at least 9,70, preferably at least 0.80, more preferably at least 0.90, when measured in a magnetic field of 5 KOe. And it is preferred that the squareness ratios in two directions perpendicular to the tape-running direction are at most 80% of the squareness ratio in the tape-running direction. The SFD (Switching Field Distribution) of the magnetic layer is preferably 0.6 or below. The center-line surface roughness Ra (cut-off value: 0.25 mm) of the magnetic layer is preferably from 1 to 10 nm, but it is desired that the Ra value be determined appropriately depending on the intended purpose. For instance, the smaller Ra value is preferred for improvement of electromagnetic characteristics, while the greater Ra value is preferred for improvement of running durability. Further, it is preferred that the RMS (root-mean-square) surface roughness RRMS determined by evaluation with AFM (atomic force microscope) is within the range of 2 to 15 nm.

The present magnetic recording medium has the upper and lower magnetic layers and, if desired, the non-magnetic layer, and it is possible to vary physical properties from layer to layer depending on the desired purpose. For instance, high elastic modulus is conferred on the magnetic layer to improve the running durability, and at the same time the elasticity modulus of the non-magnetic layer is rendered lower than that of the magnetic layer to ensure a desirable touch of a head on the magnetic recording medium. What physical properties should be imparted to each of two or more magnetic layers individually can be determined by referring to known arts of magnetic layers having multilayer structures.

The present invention will be described in more detail with reference to the following examples. The term "parts" as used hereinafter means "parts by weight" unless otherwise indicated.

EXAMPLES 1-7 AND COMPARATIVE EXAMPLE 1

(1) Uppermost magnetic layer

| | |
|---|---|
| Fine powder of ferromagnetic metal Composition: Fe/Co = 80/20 atm-%; Hc: 190 KA/m; specific surface area by BET process: 54 m²/g; Y content: 4.5 wt-% of Fe; Al content: 3.5 wt-% of Fe; average major axis length: 0.07 μm; crystallite size: 120 angstroms (acicular ratio: 5.8); σs: 120 Am²/kg | 100 parts |
| Vinyl chloride-based copolymer (MR-110, produced by Nippon Zeon Co., Ltd.) | 12 parts |
| Polyester polyuethane resin (neopentyl glycol/caprolactone polyol/MDI = | 5 parts |

-continued

| | |
|---|---|
| 0.9/2.6/1; —SO₃Na group content: 1 × 10⁻⁴ eq/g) | |
| α-Alumina (particle size: 0.18 μm) | 5 parts |
| Carbon black (particle size: 0.10 μm) | 0.5 parts |
| Butyl stearate | 1 part |
| Stearic acid | 2 parts |
| Methyl ethyl ketone | 90 parts |
| Cyclohexanone | 30 parts |
| Toluene | 60 parts |
| (2) Lower magnetic layer | |
| | |
| Fine powder of ferromagnetic metal | 100 parts |
| Composition: Fe/Co = 80/20 atm-%; Hc: | |
| 190 KA/m; specific surface area by BET | |
| process: 54 m²/g; Y content: 4.5 wt-% of Fe; | |
| Al content: 3.5 wt-% of Fe; average major | |
| axis length: 0.1 μm; crystallite size: | |
| 160 angstroms (acicular ratio: 6.3); | |
| σs: 145 Am²/kg | |
| Vinyl chloride-based copolymer | 12 parts |
| (MR-110, produced by Nippon Zeon Co., Ltd.) | |
| Polyester polyuethane resin | 5 parts |
| (neopentyl glycol/caprolactone polyol/MDI = | |
| 0.9/2.6/1; —SO³Na group content: 1 × 10⁻⁴ eq/g) | |
| Butyl stearate | 1 part |
| Stearic acid | 2 parts |
| Methyl ethyl ketone | 90 parts |
| Cyclohexanone | 30 parts |
| Toluene | 60 parts |
| (3) Non-magnetic layer | |
| | |
| Non-magnetic powder (α-Fe₂O₃) | 80 parts |
| Average major axis length: 0.1 μm | |
| Specific surface area by BET process: 48 m²/g | |
| pH: 8 | |
| Fe₂O₃ content: not less than 90% | |
| DBP absorptive capacity: 27–38 ml/100 g | |
| Surface treatment agent: Al₂O₃ | |
| Carbon black | 20 parts |
| Average primary particle diameter: 16 mμ | |
| DBP absorptive capacity: 80 ml/100 g | |
| pH: 8.0 | |
| Specific surface area by BET process: 250 m²/g | |
| Volatile matter: 1.5% | |
| Vinyl chloride-based copolymer | 12 parts |
| (MR-110, produced by Nippon Zeon Co., Ltd.) | |
| Polyester polyuethane resin | 5 parts |
| (neopentyl glycol/caprolactone polyol/MDI = | |
| 0.9/2.6/1; —SO³Na group content: 1 × 10⁻⁴ eq/g) | |
| Butyl stearate | 1 part |
| Stearic acid | 1 part |
| Methyl ethyl ketone | 100 parts |
| Cyclohexanone | 50 parts |
| Toluene | 50 parts |

The foregoing three compositions were each kneaded by a continuous kneader, and then dispersed in a sand mill. To the dispersion for the non-magnetic layer thus obtained was then added 1 part of Colonate L (trade name of polyisocyanate produced by Nippon Polyurethane Industry Co., Ltd.). To the dispersions for the uppermost magnetic layer and lower magnetic layer were each then added 3 parts of Colonate L. To these dispersions were each then added 40 parts of a 1:1 mixture of methyl ethyl ketone and cylohexanone. These dispersions were each filtered through a filter having an average pore diameter of 1 μm to obtain coating solutions for forming non-magnetic layer, uppermost magnetic layer and lower magnetic layer.

Subsequently, to a polyethylene terephthalate support having a thickness of 6 μm and a center-line surface roughness (cutoff value: 0.25 μm) of 0.01 μm was applied the coating solution for forming the non-magnetic layer thus obtained so as to have a dry thickness set forth in Table 1. To the non-magnetic layer thus obtained was immediately applied the coating solution for forming the lower magnetic layer so as to have a dry thickness set forth in Table 1. The coated material was then put between a solenoid and a cobalt magnet with the same polarity opposed to each other so that it was subjected to orientation of easily magnetizable axis in the length direction. The coated material was then dried. To the lower magnetic layer thus formed was then applied the coating solution for forming the uppermost magnetic layer so as to have a thickness set forth in Table 1. The coated material was then put between a cobalt magnet with the same polarity opposed to each other and a solenoid with the other polarity (heteropolar) opposed to each other so that it was subjected to orientation of easily magnetizable axis in the width direction. The coated material was then dried.

The coated web thus obtained was treated in a 7-stage calender composed of metallic rolls at a temperature of 90° C., and then slit into a ½ inch wide strip to prepare a tape.

Specifically, the Hc of the magnetic powder to be incorporated into the uppermost magnetic layer and the σs of the magnetic powder and the total amount of binder used in the lower magnetic layer (with the proviso that the proportion of the various components was kept constant) were varied to prepare sample tapes of Examples 1 to 7 and Comparative Example 1. Among these examples, Example 2 features that the Hc of the uppermost magnetic layer is 300 kA/m, which is close to the maximum value of 316 kA/m. Example 3 features that the lower magnetic layer comprises magnetic powder having the σs of 150 Am²/kg to have the great Br value and the thickness of the uppermost magnetic layer is as great as 0.4 μm. Example 4 features that the lower magnetic layer comprises magnetic powder having the σs of 125 Am²/kg to have the small Br value.

Example 5 features that the thickness of the uppermost magnetic layer is as small as 0.03 μm and the Br of the lower magnetic layer is reduced. Example 6 features that the thickness of the uppermost magnetic layer is as great as 0.6 μm and the Br of the lower magnetic layer is raised. Example 7 features that no lower non-magnetic layer is provided.

Comparative Example 1 features that the orientation direction of easily magnetizable axis in the uppermost magnetic layer and that in the lower magnetic layer are length directions as conventional and recording and reproduction are effected in the length direction both for servo signal and data signal.

[Evaluation Method]
(1) Hc

Samples were prepared by coating the solutions for forming the uppermost magnetic layer and lower magnetic layer, respectively, in a single layer. Using a vibration sample magnetometer (produced by Toei Industry Co., Ltd.), Hm 790 KA/m (10 kOe) was applied in the direction of easily magnetizable axis for measurement.

(2) Data Signal C/N Ratio and Servo Error Rate

A servo signal having a wavelength of 10 μm was recorded in the direction set forth in Table 1 using a thin film head having Bs of 1.7 T, a gap space of 0.5 μm and a track width of 80 μm. For the reproduction of servo signal, a shielded MR head having an element thickness of 20 nm, a shield gap of 0.4 μm and a track width of 50 μm was used.

A data signal having a wavelength of 0.5 μm was recorded in the direction set forth in Table 1 at a tape/head relative velocity of 10 m/sec using a rotary drum having an MIG head with Bs of 1.2 T, a gap length of 0.25 μm and a track width of 10 μm. The reproduction of data signal was conducted using the rotary drum having a shielded MR head with an element thickness of 20 nm, a shield gap of 0.3 μm and a track width of 10 μm.

For the measurement of C/N of data signal having a wavelength of 0.5 μm, a spectral analyzer produced by ShibaSoku Co., Ltd. was used.

Regarding the servo signal, errors were measured.

The results obtained are set forth in Table 1 below.

TABLE 1

| Constituent | Example 1 | Example 2 | Example 3 | Example 4 | Example 5 | Example 6 | Example 7 | Comparative Example 1 |
|---|---|---|---|---|---|---|---|---|
| Orientation direction of easily magnetizable axis in uppermost magnetic layer | Width | Width | Width | Width | Width | Width | Width | Length |
| Signal recording direction | width | width | Width | Width | Width | Width | Width | |
| Orientation direction of easily magnetizable axis in lower magnetic layer | Length | Length | Length | Length | Length | Length | Length | Length |
| Signal recording direction | Length | Length | Length | Length | Length | Length | Length | Length |
| Hc of uppermost magnetic layer [KA/m] | 190 | 300 | 162 | 190 | 146.5 | 330 | 190 | |
| Thickness of uppermost magnetic layer [$\mu$m] | 0.1 | 0.06 | 0.4 | 0.1 | 0.03 | 0.6 | 0.1 | |
| Thickness of lower magnetic layer [$\mu$m] | 0.2 | 0.2 | 0.7 | 0.2 | 0.2 | 0.2 | 2.5 | Length |
| Br of lower magnetic layer [G] | 3,200 | 3200 | 4,8000 | 2,600 | 2,300 | 5,100 | 3,500 | |
| Thickness of non-magnetic layer [$\mu$m] | 1.2 | 1.2 | 1.2 | 1.2 | 1.2 | 1.2 | None | 190 |
| | | | | | | | | 0.1 |
| | | | | | | | | 2.5 |
| | | | | | | | | 3,200 |
| | | | | | | | | None |
| Kind of magnetic powder in uppermost magnetic layer | Fe—Co | Ba—Fe | Fe—Co | Fe—Co | Fe—Ni | Ba—Fe | Fe—Co | Fe—Co |
| Ec of magnetic powder in uppermost magnetic layer [KA/m] | 190 | 290 | 159 | 190 | 143 | 315 | 190 | 190 |
| σs of magnetic powder in lower magnetic layer | 145 | 145 | 150 | 120 | 120 | 153 | 145 | 145 |
| Total amount of binder in lower magnetic layer [parts] | 20 | 20 | 15 | 20 | 25 | 15 | 20 | 20 |
| Data signal C/N ratio [dB] | 6.5 | 5.8 | 5.6 | 6.8 | 2.9 | 3.1 | 2.7 | 0 |
| Servo error rate | $6 \times 10^{-6}$ | $1 \times 10^{-5}$ | $2 \times 10^{-5}$ | $9 \times 10^{-5}$ | $2 \times 10^{-4}$ | $5 \times 10^{-4}$ | $6 \times 10^{-5}$ | $7 \times 10^{-3}$ |

It can be seen from the results shown in Table 1 that Example 1 attains both a high C/N ratio of data signal and a low error ratio of servo signal, and that all of Examples 1 to 4 are particularly excellent in the C/N ratio of data signal and error rate of servo signal error Examples 5 to 7 have the desired effects of the invention and exhibit sufficiently good properties as compared with the comparative example, while they are somewhat inferior to Examples 1 to 4.

As can be seen from Table 1, the magnetic recording medium according to the invention can provide data signal with a high C/N ratio and a low error rate of servo signal.

The magnetic recording medium according to the invention can attain both a highly precise servo write and a higher recording density.

What is claimed is:

1. A magnetic recording medium comprising:

a support; and at least two magnetic layers which include an uppermost magnetic layer and a lower magnetic layer, wherein an easily magnetizable axis of the uppermost magnetic layer and an easily magnetizable axis of the lower magnetic layer are oriented in directions crossing each other at right angles.

2. The magnetic recording medium according to claim 1, wherein the easily magnetizable axis of the uppermost magnetic layer is oriented in a width direction and the easily magnetizable axis of the lower magnetic layer is oriented in a length direction.

3. The magnetic recording medium according to claim 1, wherein the uppermost magnetic layer has a thickness of from 1/10 to 1 time the shortest recording wavelength for recording an information signal in the uppermost magnetic layer, and a coercive force Hc of from 158 KA/m to 316 KA/m, and the lower magnetic layer has a residual magnetic flux density Br of from 2,500 G to 5,000 G.

4. The magnetic recording medium according to claim 1, which further comprises a non-magnetic layer containing a non-magnetic powder under the at least two magnetic layers.

5. The magnetic recording medium according to claim 1, wherein the uppermost magnetic layer has a coercive force Hc of from 158 KA/m to 316 KA/m.

6. The magnetic recording medium according to claim 1, wherein the uppermost magnetic layer has a coercive force Hc of from 174 KA/m to 237 KA/m.

7. The magnetic recording medium according to claim 1, wherein the uppermost magnetic layer has a thickness of from 1/10 to 1 time the shortest recording wavelength for recording an information signal in the uppermost magnetic layer.

8. The magnetic recording medium according to claim 1, wherein the uppermost magnetic layer has a thickness of from 1/8 to 0.6 time the shortest recording wavelength for recording an information signal in the uppermost magnetic layer.

9. The magnetic recording medium according to claim 1, wherein the lower magnetic layer has a thickness of 0.05 to 3 $\mu$m.

10. A signal recording system which comprises: recording an information signal in a width direction in the uppermost magnetic layer of the magnetic recording medium according to claim 1; and recording a servo signal in a length direction in the lower magnetic layer thereof.

* * * * *